United States Patent [19]
Burker

[11] 4,368,833
[45] Jan. 18, 1983

[54] ANTI-BRIDGING PORT FOR CO-ROTATIONAL SCREW MACHINE

[75] Inventor: George W. Burker, Yorktown, N.Y.

[73] Assignee: Werner & Pfleiderer Corporation, Ramsey, N.J.

[21] Appl. No.: 271,714

[22] Filed: Jun. 8, 1981

[51] Int. Cl.³ ............................................. B65G 33/18
[52] U.S. Cl. .................................... 222/575; 222/238
[58] Field of Search ............... 222/271, 238, 413, 575; 198/670, 671, 663

[56] References Cited

U.S. PATENT DOCUMENTS

| | | | |
|---|---|---|---|
| 3,043,480 | 7/1962 | Wittrock | 222/413 X |
| 3,240,401 | 3/1966 | Kirschmann | 222/575 X |
| 4,078,653 | 3/1978 | Suter | 198/663 |

FOREIGN PATENT DOCUMENTS 541506 12/1931 Fed. Rep. of Germany ...... 222/413

Primary Examiner—Allen N. Knowles
Attorney, Agent, or Firm—Felfe & Lynch

[57] ABSTRACT

In a housing for co-rotational twin screw machine for longitudinally conveying non-free flowing materials, the housing having two intersecting cylindrical bores for receiving two intermeshing screws and means forming at least one port thereover, the improvement wherein the means forms an anti-bridging port comprising one planar longitudinal side wall having the lower edge thereof disposed adjacent the intersecting area of the two bores and wherein the sidewall slopes outwardly from the lower edge above one bore at about 60° to 90° with respect to the horizontal plane and extends approximately tangentially with respect to said one bore.

11 Claims, 7 Drawing Figures

DIRECTION OF
MATERIAL FLOW

ANTI-BRIDGING PORT FOR CO-ROTATIONAL SCREW MACHINE

BACKGROUND OF THE INVENTION

The present invention relates to a port for a co-rotational twin screw machine and in particular to a port which prevents the bridging of non-free flowing materials in such screw machine equipment.

It is generally known in the screw machine art that a problem of "bridging" occurs at feed ports and vent ports in twin co-rotational screw machines when non-free flowing materials such as the highly viscous Ecodex resin is conveyed therein. This bridging effect causes the material to slowly build upon itself until it closes the port or causes the material to overflow out of the port which is clearly undesirable.

SUMMARY OF THE INVENTION

The main object of the present invention is to provide an anti-bridging port in a housing for a co-rotational twin screw machine.

This and other objects of the present invention are achieved in accordance with the present invention in a housing for a co-rotational screw machine wherein the housing has cylindrical bores for receiving two intermeshing screws, wherein the means forming the anti-bridging port comprises one planar longitudinal side wall having the lower edge thereof disposed adjacent the intersecting area of the two bores and wherein the side wall slopes outwardly from the lower edge above one bore at about 60°–90° with respect to the longitudinal plane and extends approximately tangentially with respect to the one bore.

The longitudinal side wall also preferably slopes inwardly towards the intersecting area in the direction of material flow from about 0°–30° with respect to the vertical plane.

In a particularly advantageous commercial embodiment wherein Ecodex resin with a 65% moisture content is conveyed in the housing, the side wall slopes inwardly at about 5° and outwardly at about 70°.

The anti-bridging port according to the present invention can be an inlet port or a venting port and can be utilized in any twin screw co-rotating feeder, conveyor, mixer, extruder, crammer or stuffer.

In another advantageous embodiment of the present invention, the port is formed in a barrel section of a multibarrel screw machine and further, the means forming the anti-bridging port according to the present invention can comprise an insert which is configured to fit within a conventional port and which converts the longitudinal side wall thereof to have the position set forth consistent with the above object of the present invention.

The unique configuration of the anti-bridging port according to the present invention permits the continuous feeding and/or venting of non-free flowing materials in twin screw corotational equipment. The unique design produces a backward rolling motion of material that continually washes major contact surfaces, thus preventing building up or bridging of material. The 60°–90° slope opening is incorporated in the port to induce a backward rolling motion of material. This slope surface is located approximately tangentially to the upturning, far side screw. This configuration eliminates the perpendicular hitting and sticking of material which commonly occurs in present designs. A washdown effect is also present when the new material is fed onto the 60°–90° slope surface. Additionally, the 0°–30° inward sloping acts to retard the downstream movement and increase the infeed or venting capacity of the port.

These and other objects and advantages of the present invention will become more apparent with respect to the detailed description of the invention set forth hereinafter and which refers to the attached drawings, wherein:

DETAILED DESCRIPTION OF THE PREFERRED EMBODIMENTS

Figure 1:
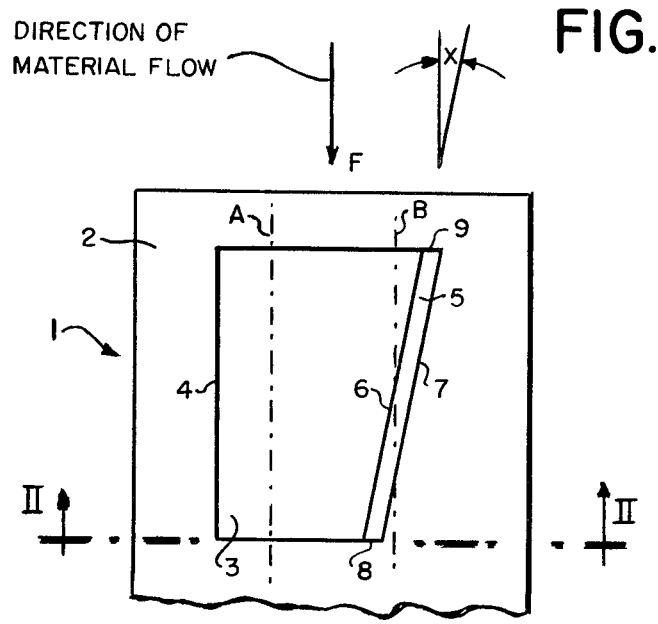
FIG. 1 is a top view of the anti-bridging port in a housing in accordance with the present invention.
Figure 2:
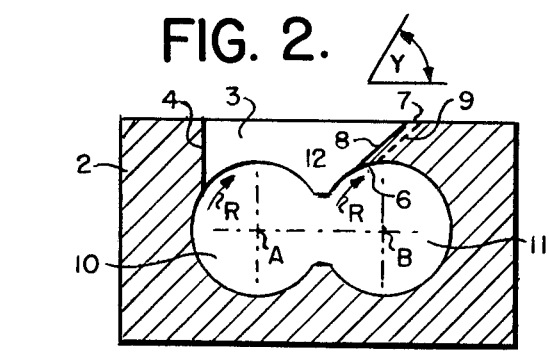
FIG. 2 is a sectional view along line II—II of FIG. 1.

Referring now to FIGS. 1–2, the anti-bridging port 3 is shown in a screw machine 1 having a continuous elongated housing 2. The housing 2 for co-rotational twin screws is provided with bores 10 and 11 therein which have an intersecting portion 12 corresponding to where the threads of the screws to be received in bores 10 and 11, intermesh. The screws have axes A and B as their centers of rotation and rotate in the direction R shown in FIG. 2. As a result, the direction of material flow F is achieved within the housing 2.

The anti-bridging port 3 is disposed above the bores 10 and 11 and in the embodiment shown has vertical longitudinal side wall 4 which is depicted as shown but is not in critical to the present invention.

A critical importance is the configuration of the longitudinal side wall 5, which as shown in FIGS. 1 and 2, extends at an angle Y, preferably 60°–90° with respect to the horizontal plane with the lower edge 6 thereof starting from the vicinity of the intersecting portion 12 of the bores 10 and 11 so as to be substantially tangential to bore 11. The side wall 5 slopes outwardly, ending at edge 7 over the throughbore 11.

The longitudinal side wall 5 also is sloped inwardly towards the intersecting portion 12 in the direction of material flow at an angle X with respect to the vertical axis. This angle is preferably from 0° to 30° and is bounded by edges 8 and 9 as shown.

In a particularly advantageous commercial embodiment it has been found that for viscous material such as Ecodex resin with 65% moisture content, angle Y is preferably 70° and angle X is preferably 5°.

Figure 5:
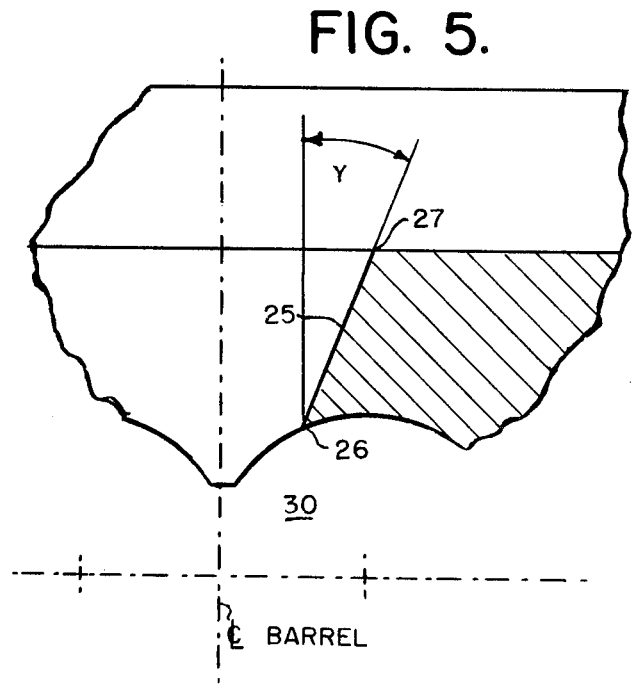
FIG. 5 is a partial sectional view along line V—V in FIG. 3.
Figure 4:
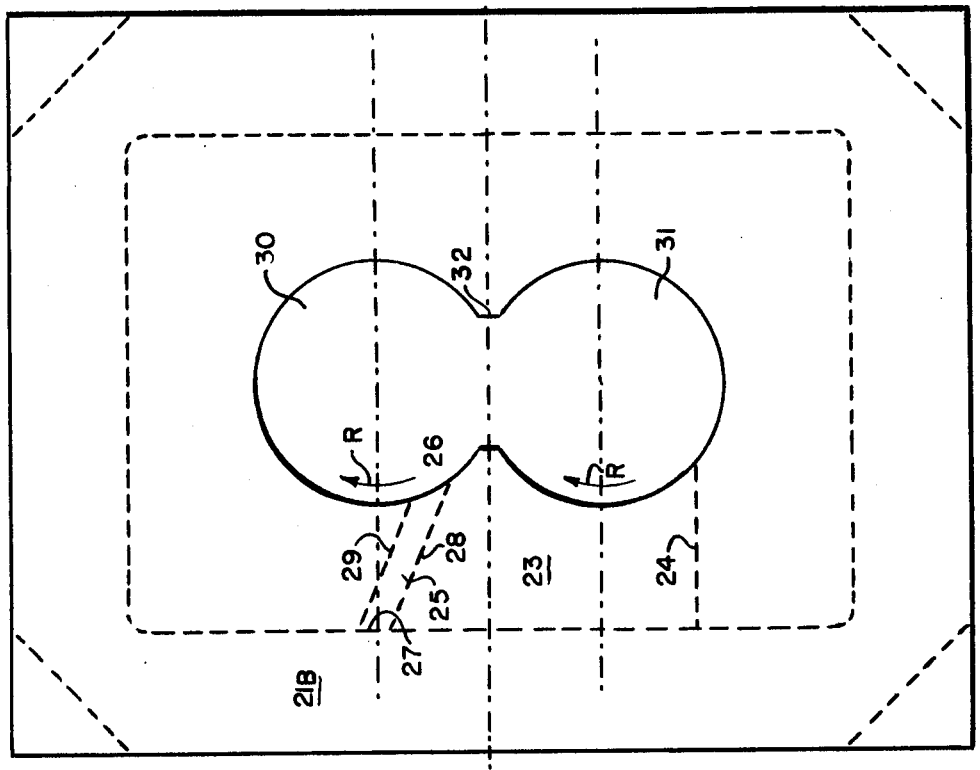
FIG. 4 is a side view of the structure of FIG. 3.
Figure 3:
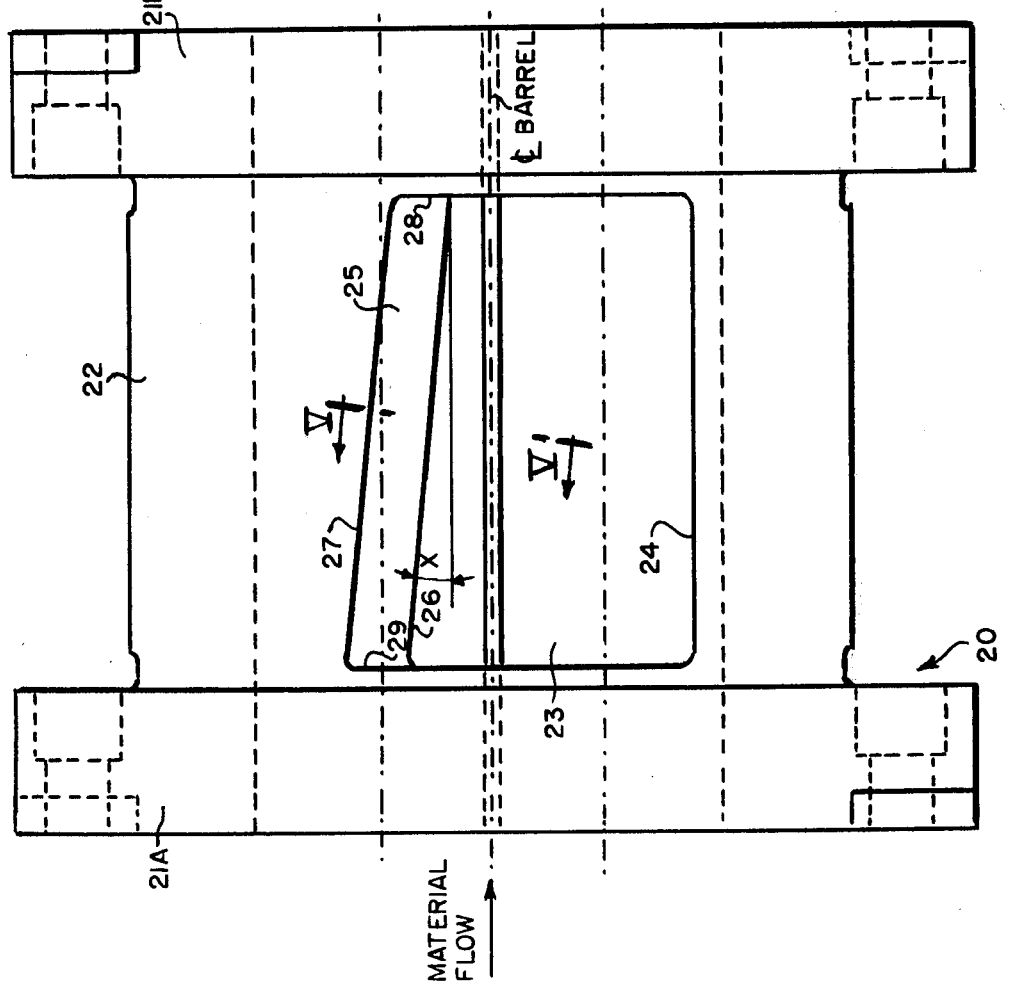
FIG. 3 is a top view of the port according to the present invention in a barrel section.

Referring now to FIGS. 3–5, another embodiment of the present invention is shown for screw machines which are formed from a plurality of barrel sections 20 which are interconnected mechanically by screw fasteners and the like to form an elongated barrel for receiving co-rotational twin screws.

In this embodiment, the anti-bridging port is formed in one or more of the barrel sections 20 as is shown in FIG. 3. In this embodiment, the barrel section 20 includes connecting flanges 21A and 21B and the central portion 22 in which the anti-bridging port 23 is formed. The FIGS. 3-5 include the center lines for the barrel and rotational axes of the screws to be inserted in bores 30 and 31 so as to indicate the location of the longitudinal side wall 25 with respect to the bores 30 and 31 and the intersecting portion 32 therebetween. Consistent with the first embodiment, the direction of rotation R is shown in FIG. 4 as is the direction of material flow.

In this embodiment, the port 23 has a generally rectangular configuration, with the exception of the side wall 25 which is bounded by edges 26-29 and slopes outwardly at angle Y shown in FIG. 5 and inwardly at angle X shown in FIG. 3. The position of the side wall 25 as illustrated with respect to the center lines of the barrel and screws as is shown in FIG. 4, represent a particularly advantageous embodiment for the flow of Ecodex resin with 65% moisture content, a highly viscous material. As shown the edge 28 is substantially tangential to the bore 30 in the vicinity of the intersecting portion 32 in order to achieve the effect explained hereinbefore.

Figure 7:
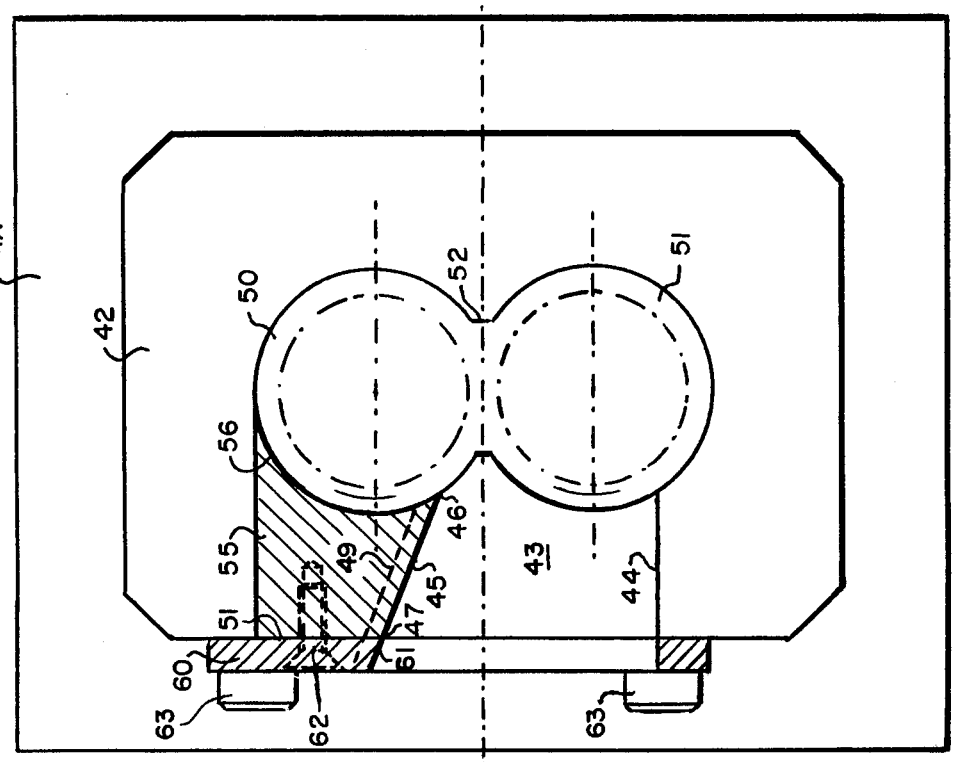
FIG. 7 is a partial sectional view along line VII—VII in FIG. 6.
Figure 6:
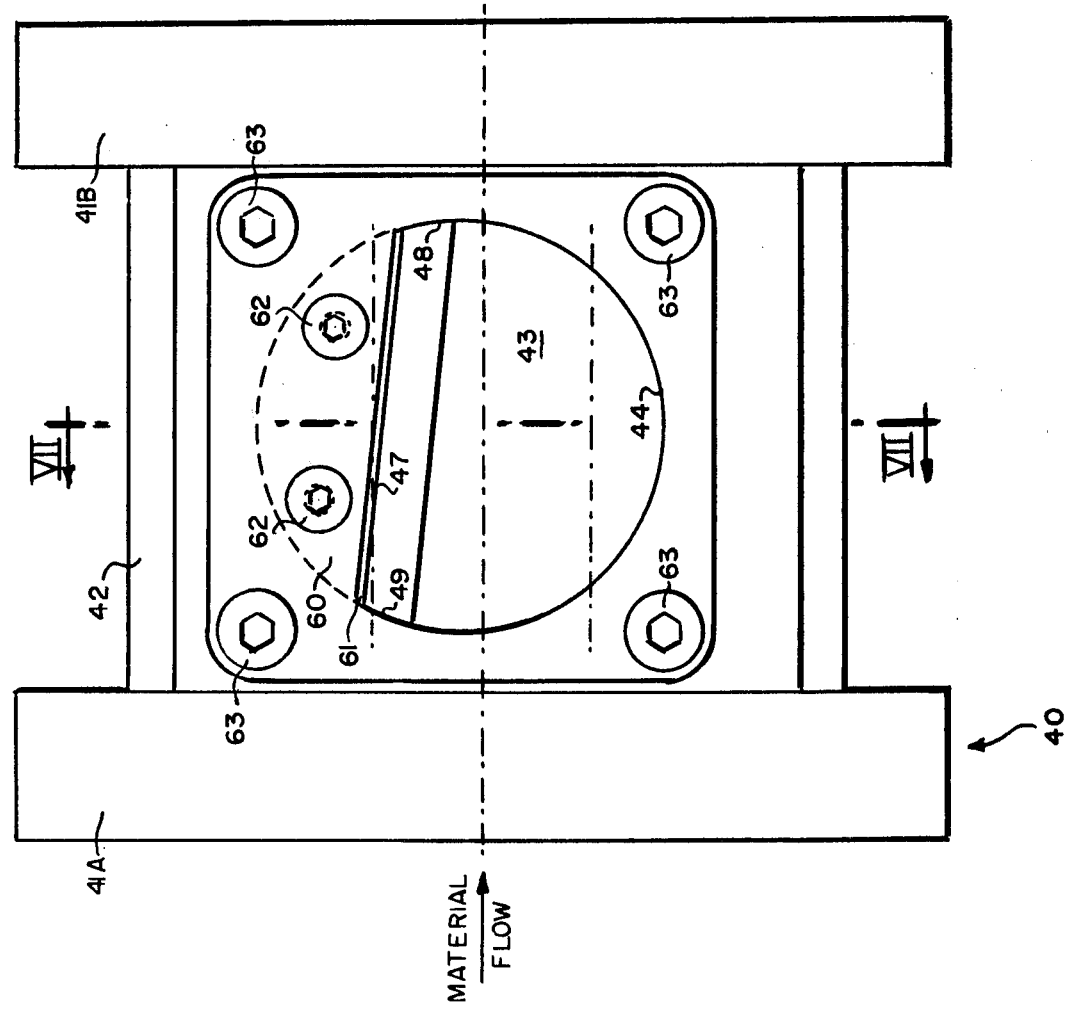
FIG. 6 is a top view of an insert forming the anti-bridging port according to the present invention.

FIGS. 6 and 7 show another embodiment of the present invention wherein the means are provided for forming a port 43 having a longitudinal side wall 45 according to the present invention in a barrel section 40 having the connecting flange portions 41A, 41B and the central portion 42.

The insert performing the port 43 is inserted in an already existing cylindrical port 44 disposed above screw bores 50, 51 having the intersecting portion 52 therebetween.

The insert comprises a main portion 55 having a substantially cylindrical segment configuration and bounded at the top by planar surface 57 and at the bottom by arcuate surface 56 which is configured to form port of the bore 50 for a screw. One side of the member 55 includes the one longitudinal side wall 45 configured according to the present invention and bounded by edges 46-49.

The body 55 is held in place by plate 60 which is screwed in place by screws 62 which connect with body 55 and which also includes edge 61 which forms a continuation of the longitudinal side wall 45. The plate 60 is further held in place by screws 63 so as to be rigidly and removably fixed onto barrel section 42.

It will be appreciated that the insert can be formed for a substantially rectangular port as well as ports of other configurations.

It will be appreciated that the instant drawings, specification and claims are set forth by way of illustration and not limitation, and that various modifications and changes may be made without departing from the spirit and scope of the present invention.

What is claimed is:

1. In a housing for a co-rotational twin screw machine for longitudinally conveying non-free flowing material, the housing having two intersecting cylindrical bores for receiving two intermeshing screws and means forming at least one port thereover, the improvement wherein the means forms an anti-bridging port comprising one planar longitudinal side wall having the lower edge thereof disposed adjacent the intersecting area of the two bores and wherein the side wall slopes outwardly from the lower edge above one bore at about 60° to 90° with respect to the horizontal plane and extends approximately tangentially with respect to said one bore.

2. The anti-bridging port according to claim 1, wherein the one side wall slopes inwardly towards the intersecting area in the direction of material flow from about 0° to 30° with respect to the vertical plane.

3. The anti-bridging port according to claim 2, wherein the one side walls slopes inwardly at about 5°.

4. The anti-bridging port according to claim 1 or 3, wherein the one wide wall slopes outwardly at about 70°.

5. The anti-bridging port according to claim 1, wherein the housing comprises at least one barrel section including the means forming the anti-bridging port therein.

6. The anti-bridging port according to claim 1 or 5, wherein the means forming the port comprises an aperture in the housing and an insert mounted in the aperture and configured to form the one side wall when mounted in the aperture.

7. The anti-bridging port according to claim 6, wherein the one side wall slopes inwardly towards the intersecting area in the direction of material flow from about 0° to 30° with respect to the vertical plane.

8. The anti-bridging port according to claim 7, wherein the one side wall slopes inwardly at about 5° and outwardly at about 70°.

9. An anti-bridging insert for use in a housing for a co-rotational twin screw machine which longitudinally conveys non-free flowing material, the housing having two intersecting cylindrical bores for receiving two intermeshing screws and at least one port thereover, the insert comprising a means for mounting same in the port and means for forming one planar longitudinal side wall when the insert is mounted in the port, having the lower edge thereof disposed adjacent the intersecting area of the two bores, the side wall sloping outwardly from the lower edge above one bore at about 60° to 90° with respect to the horizontal plane and extending approximately tangentially with respect to said one bore.

10. The insert according to claim 9, wherein the one side wall slopes inwardly towards the intersecting area in the direction of internal flow from about 0° to 30° with respect to the vertical plane.

11. The insert according to claim 10, wherein the one side wall slopes inwardly at about 5° and outwardly at about 70°.

* * * * *